United States Patent
Chabaud et al.

(10) Patent No.: US 7,398,340 B2
(45) Date of Patent: Jul. 8, 2008

(54) METHOD FOR THE MANAGEMENT OF PERIPHERALS IN AN INTEGRATED CIRCUIT

(75) Inventors: Myriam Chabaud, Trets (FR); Thierry Albaret, Aix en Provence (FR)

(73) Assignee: STMicroelectronics SA, Montrouge (FR)

( * ) Notice: Subject to any disclaimer, the term of this patent is extended or adjusted under 35 U.S.C. 154(b) by 1136 days.

(21) Appl. No.: 10/182,010

(22) PCT Filed: Jan. 26, 2001

(86) PCT No.: PCT/FR01/00258

§ 371 (c)(1),
(2), (4) Date: Sep. 30, 2002

(87) PCT Pub. No.: WO01/55849

PCT Pub. Date: Aug. 2, 2001

(65) Prior Publication Data

US 2005/0021991 A1    Jan. 27, 2005

(30) Foreign Application Priority Data

Jan. 27, 2000    (FR) .................................. 00 01062

(51) Int. Cl.
*G06F 3/00*    (2006.01)
*G06F 13/12*   (2006.01)
*G06F 13/00*   (2006.01)
*G06F 9/44*    (2006.01)

(52) U.S. Cl. .......................... 710/62; 710/48; 710/301; 717/100

(58) Field of Classification Search ....................... None
See application file for complete search history.

(56) References Cited

U.S. PATENT DOCUMENTS

| | | | |
|---|---|---|---|
| 6,003,134 A | | 12/1999 | Kuo et al. ..................... 713/200 |
| 6,105,119 A | * | 8/2000 | Kerr et al. .................... 711/219 |
| 6,179,489 B1 | * | 1/2001 | So et al. ...................... 718/102 |
| 6,253,193 B1 | * | 6/2001 | Ginter et al. .................. 705/57 |
| 6,298,370 B1 | * | 10/2001 | Tang et al. ................... 718/102 |

OTHER PUBLICATIONS

Teo et al., Microcomputer-Based Multi-Tasking on a SCADA System Using Interrupts in MS-DOS, Computers in Industry, NL, Elsevier Science Publishers, vol. 22, No. 1, Jun. 1, 1993, pp. 93-102, XP000381059.

* cited by examiner

*Primary Examiner*—Alan S. Chen
(74) *Attorney, Agent, or Firm*—Lisa K. Jorgenson; Allen, Dyer, Doppelt, Milbrath & Gilchrist, P.A.

(57) ABSTRACT

A microprocessor-based integrated circuit for smart cards includes an application software layer and a peripheral management system including an intermediate software layer to manage the hardware processes on peripherals of the integrated circuit that are called up by at least one process of the application software layer.

19 Claims, 2 Drawing Sheets

METHOD FOR THE MANAGEMENT OF PERIPHERALS IN AN INTEGRATED CIRCUIT

FIELD OF THE INVENTION

The present invention relates to the field of electronic circuits, and, more particularly, to a system for the management of peripherals in a microprocessor-based integrated circuit. Moreover, it relates especially to smart card type applications.

BACKGROUND OF THE INVENTION

One integrated circuit for a smart card type application is commonly called a microcircuit or an electronic micromodule. In addition to a microprocessor, a microcircuit includes a number of other hardware resources, generally called peripherals, such as counters, serial interface circuits, random-number generators, clock-signal generators, etc. Also, memories are usually provided, particularly a read only program memory (ROM), electrically erasable programmable read only memories (EEPROMs) for storing application data, or working memories such as random access memories (RAMs). It has also been the practice to have a peripheral access controller that manages the address and data buses with the peripherals.

An integrated circuit of this kind is commonly delivered to a customer who is not necessarily the final user. For this customer, at least one application has been implemented in this integrated circuit, depending on its final purpose. The present trend is towards the implementation of several applications at a given time, one of which is activated by an external application.

These applications may be of different types. They may be, for example, a smart-card operating system, a cryptographic library that could be used for computations or signature verification, enciphering, or incorporated test software. This list of applications is not exhaustive.

These applications are implemented in the integrated circuit in the form of software processes in an application software layer. These processes are executed by the microprocessor of the integrated circuit. To perform certain operations of a given software process, the application software layer must call up processes in the peripherals, hereinafter referred to as hardware processes (as opposed to software processes).

Usually, the application software does so directly, i.e., it directly manages the peripherals of the integrated circuit. To this end, the integrated circuit manufacturer provides all the necessary information, including the addresses of the different peripherals of the integrated circuit, the addresses (in ROM program memory) of the tables of the hardware interrupt vectors, etc. These pieces of information are specific to the integrated circuit. They enable the application software layer to directly call up the hardware process on a peripheral. They also enable the software layer to manage the peripherals in interrupt mode. This means that it can continue to work for as long as the peripheral has not finished executing a requested hardware process (e.g., the programming of an EEPROM memory page).

In this case, it is the application software layer that directly manages the hardware interrupts sent by the peripherals. This implies that it must read and write registers and access the table of the hardware interrupt vectors in the ROM program memory to identify an interrupt source and undertake the necessary action.

Of course, further improvements in the security of the smart cards are constantly being sought in an attempt to prevent any use of these cards for fraudulent purposes.

SUMMARY OF THE INVENTION

An object of the invention is to provide a secure system for managing peripherals in a smart-card integrated circuit.

This and other objects are provided according to the present invention by an intermediate software layer acting as a safety barrier between the application software layer and the hardware resources of the integrated circuit, namely the microprocessor and the peripherals. According to the invention, this intermediate software layer manages all the peripherals on behalf of the application software layer. Thus, when a process of the application software layer calls up a hardware process on a peripheral, this call is managed by the intermediate software layer. For this purpose, the invention uses a software interrupt instruction by which a function of the intermediate software layer is called up.

When the intermediate software layer has terminated the processing operation linked to the called-up function, it makes a return to the application software layer by a return from interrupt instruction. Through this mechanism, the application software layer no longer needs to know the hardware characteristics specific to the product, such as the address of the table of the hardware interrupt vectors, the address of the peripherals, etc. Thus, a safety barrier is created between the hardware resources of the integrated circuit and the application.

Furthermore, the execution time for a particular hardware process on a peripheral may be fairly lengthy (e.g., the programming of one or more words in EEPROM memory). Preferably, to improve the performance characteristics of the card, the intermediate software layer may immediately release the application software layer that has called up a hardware process. In this case, the intermediate software layer itself manages the peripherals in the interrupt mode. This enables the application software layer to continue working and the intermediate software layer to process other calls for hardware processes as needed.

In this case, when a peripheral has ended the execution of a hardware process, it sends a hardware interrupt which stops the performance in progress in the microprocessor and diverts it to the management of the hardware interrupts in the intermediate software layer. According to the invention, the hardware interrupt processing in the intermediate software layer may include interrupting the application software layer to enable this layer to end the corresponding process. Thus, there is a sharing of the hardware interrupt processing, and the intermediate software layer fulfils its function of a safety barrier by processing the interrupt that corresponds to the hardware aspect. This is especially the case for the reading and writing of registers to identify the source of the hardware interrupt. Additionally, this is done while the application software layer carries out the rest of the processing of the interrupt which is related to the application.

Thus, the invention relates to a system for the management of peripherals in an microprocessor-based integrated circuit for smart cards including an application software layer including at least one process requiring the execution of hardware processes on at least one peripheral of the integrated circuit. The system may include an intermediate software layer to manage the hardware processes called up by a process of the application software layer.

BRIEF DESCRIPTION OF THE DRAWINGS

Other features and advantages of the invention are given in the following description, by way of non-limitative example, with reference to the appended drawings, in which.

DETAILED DESCRIPTION OF THE PREFERRED EMBODIMENTS

Figure 1:
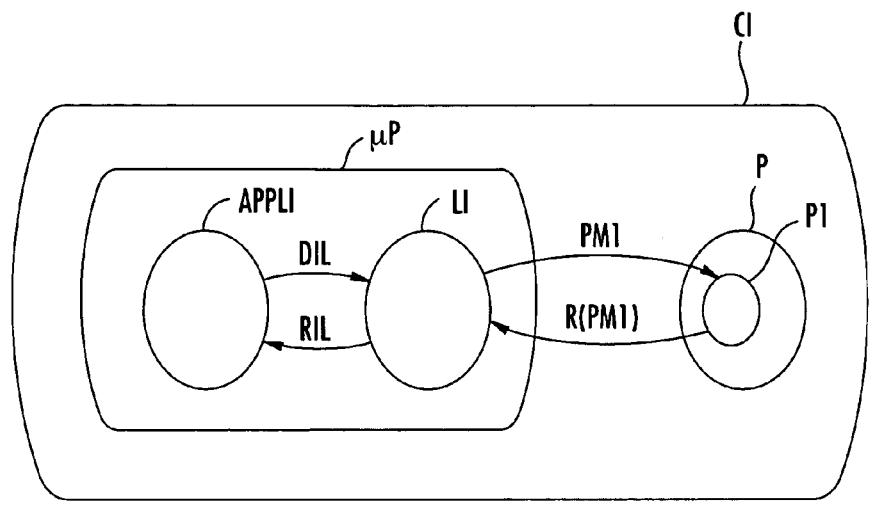
FIG. 1 is a schematic diagram of a system for the management of peripherals according to the invention.

Turning now to FIG. 1, a system for the management of peripherals according to the invention is now described. This system may generally be applied to an integrated circuit CI including a microprocessor μP and peripherals P. It may be applied especially to integrated circuits for smart-card type applications. The peripherals of such integrated circuits usually include at least one ROM program memory including software processes of the application layer APPLI and the program corresponding to the intermediate software layer LI according to the invention.

The processes or programs of the application layers APPLI and intermediate layers LI are executed by the microprocessor μP. This is why it has been chosen to show them in FIG. 1 inside a logic box representing the microprocessor μP. At a given time, the microprocessor executes a given process or program of the application layer APPLI. It may in practice be interrupted in this execution by a hardware or software interrupt.

According to the invention, when the processing of the application layer APPLI performed by the microprocessor μP requires the execution of a hardware process in a peripheral, it uses the software interrupt instruction DIL to call up a function corresponding to the layer LI. This software interrupt start instruction DIL is executed by the microprocessor μP. The processing of this software interrupt includes the launching of the corresponding hardware process PM1 on the concerned peripheral P1. The result of this hardware process R (PM1) (which may simply be an indicator to signify that the process is performed) is returned to the application layer with the return from software interrupt instruction RIL.

Figure 2:
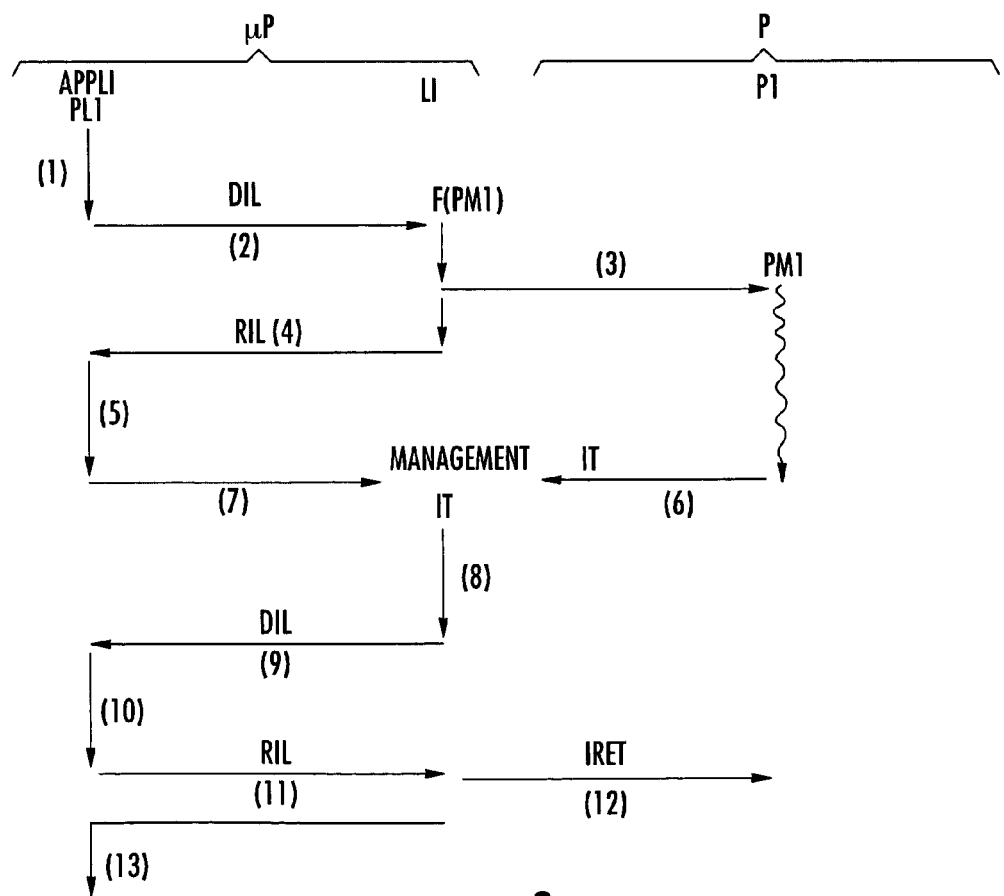
FIG. 2 is a flow diagram illustrating an exemplary processing of a call for a function of the application software layer by the intermediate software layer according to the present invention.

More specifically, and as shown in FIG. 2, the microprocessor μP executes (1) a process PL1 of the application software layer. In this process PL1, microprocessor μP needs to execute a hardware process PM1. It then sends a software interrupt instruction DIL (2) to call up a corresponding function F (PM1) of the intermediate software layer. This software interrupt is processed by the intermediate software layer LI, which calls up (3) the corresponding hardware process PM1 on the concerned peripheral P1, in interrupt mode. The intermediate software layer LI hands over control (4) to the application software layer which may continue (5) with other processing operations. In particular, it may call up other different operations of the intermediate software layer to launch other hardware processes.

When the hardware process PM1 is ended, the concerned peripheral P1 sends (6) a hardware interrupt IT. This stops (7) the processing in progress in the microprocessor μP, which in this example is a processing of the application software layer (although it could also be a processing of another function LI, for example) to send it on towards the management of the interrupt (8) by the software layer LI. This management includes the reading and writing of the table of hardware interrupt vectors enabling the identification of the source of the hardware interrupt, P1 in this example.

The management further includes the onward sending (9) of this interrupt to the application software layer APPLI to enable the processing (10) of the interrupt by the caller software process. This onward sending is done by a software interrupt instruction DIL sent this time by the intermediate software layer LI. When the concerned process PL1 of the application software layer has ended its processing of the interrupt, it releases (11) the intermediate software layer LI which, in turn, releases (12) the peripheral P1. The microprocessor μP may then resume (13) the current processing at the place where it had been stopped.

The considerations related to the interrupt mode will not be presented herein in detail. This is a typical mode of communication with peripherals that is well known to those skilled in the art. It can simply be noted that the management system according to the invention, which uses the software interrupt start assembler instruction DIL, in practice associates one domain with each of the processes PL1 of the applications software layer and one domain with the intermediate software layer LI. As such, there is one software interrupt vector associated with each of these domains. Thus, when a software interrupt instruction DIL is sent, the table of interrupt vectors is used to identify the sender and launch the corresponding interrupt processing operation. This table is in the intermediate software layer.

Furthermore, if a peripheral on which the intermediate software layer LI has to launch a hardware process is busy, the step (4) of FIG. 2 in which the intermediate software layer LI releases the application software layer includes the forwarding of a corresponding information element informing it that the peripheral is unavailable. The functions of the intermediate software layer LI that may be called up may also be defined for each domain. In such case, if the function of the intermediate software layer LI called up by a given process is not part of the definition of the field associated with this process, then the intermediate software layer LI will send an information element along with the return from interrupt instruction RIL indicating that the function is not accessible. If, to the contrary, the peripheral is available, it releases the application software layer by sending back to it a corresponding information element, informing it that its request is in progress in the concerned peripheral.

The invention therefore uses the possibilities offered by the software interrupt mode of the microprocessor μP to create a safety barrier between the application software layer and the peripherals. In particular, the application software layer no longer needs to know the addresses of the peripherals and of the tables of the hardware interrupt vectors and other information, i.e., particularly important information regarding security. It must only implement the software interrupt mode through which it sends its calls for functions on the intermediate software layer which manages the peripherals in its place.

In practice, in the case of the integrated circuits for smart card type applications, the source code (assembler) program compilers generally do not incorporate any software interrupt start assembler instruction DIL and the associated return from interrupt assembler instruction RIL. Preferably, to prevent the developers of the processes of the application layer and the developers of the intermediate software layer LI from having to program in assembler language, the invention that the intermediate software layer LI may contain macro-instructions for each function call.

Figure 3:
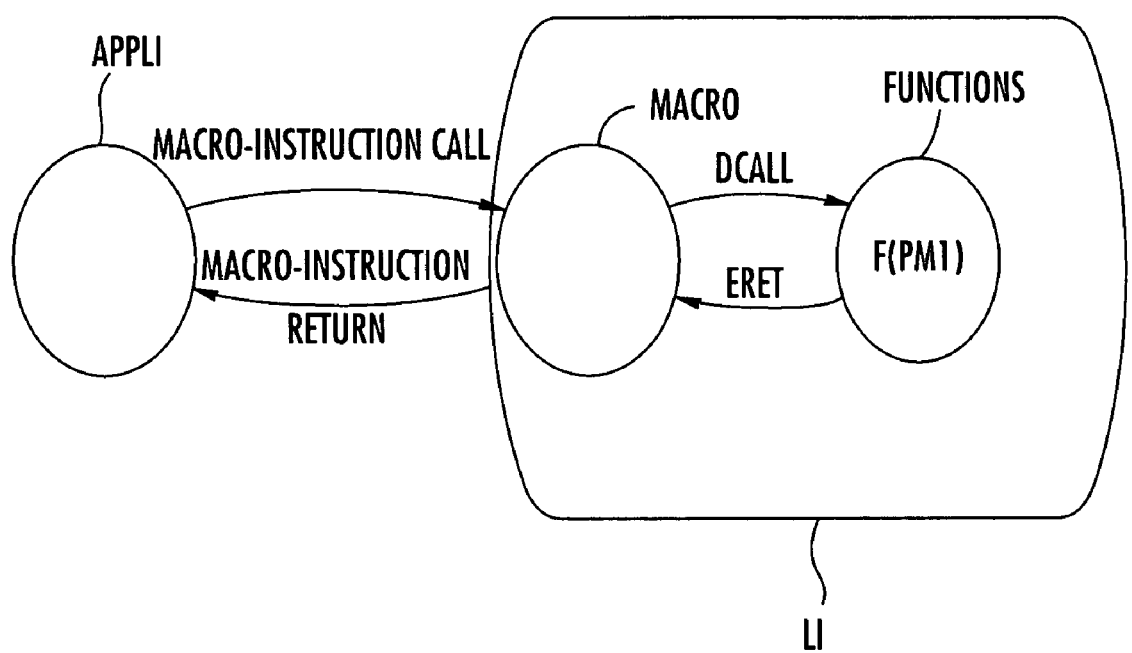
FIG. 3 is a schematic diagram illustrating an exemplary implementation of the invention using macro-instructions to make the calls between the application software layer and the intermediate software layer.

The application software layer must therefore only call up a macro-instruction of the intermediate software layer LI. This macro-instruction includes the transfer of the parameters linked to the function LI to be executed and the execution of the assembler instruction DIL. Through this mechanism, it is the intermediate software layer LI that sends the software interrupt instruction DIL. The processing of this interrupt DIL by the intermediate software layer LI in turn sends a message toward a function LI. Thus, only the part of the intermediate software layer LI that contains the macro-instructions must be developed in assembler language. The application software layer and the functions of the intermediate software layer LI are, for their part, developed in a very advanced language, typically C. A corresponding schematic block diagram is shown in FIG. 3.

The invention that has just been described creates a safety barrier between the application layer and the peripherals of the integrated circuit. Furthermore, the sharing of the processing of the hardware interrupts between the intermediate and application software layers optimizes communication between these two layers. This enables the concerned application itself to process the hardware interrupt linked to the application while at the same time allowing the intermediate software layer LI to carry out its barrier role. This leaves to it all the aspects of the processing related to the hardware, especially the identification of the source of the interrupt.

That which is claimed is:

1. A system for managing at least one peripheral of a microprocessor-based integrated circuit for a smart card comprising:
    an application software layer comprising at least one process for calling up hardware processes to be executed on the at least one peripheral of the integrated circuit; and
    an intermediate software layer for creating a safety barrier between said application layer and the at least one peripheral by managing the hardware processes called up by the at least one process of said application software layer;
    said application software layer being mutually exclusive of said intermediate software layer and calling up a function of said intermediate software layer corresponding to a hardware process to be executed, with the function being called up by a macro-instruction of said intermediate software layer, and with a programming language of the macro-instruction being different from a programming language of said application software layer and said intermediate software layer.

2. The system according to claim 1 wherein said application software layer calls up the function by sending a software interrupt.

3. The system according to claim 2 wherein said intermediate software layer processes the software interrupt by verifying an availability of the called up function.

4. The system according to claim 2 wherein said intermediate layer manages the hardware processes in an interrupt mode.

5. The system according to claim 4 wherein said intermediate software layer processes a hardware interrupt of the at least one peripheral by using the software interrupt of said application software layer to enable a processing operation in said application software layer corresponding to the hardware interrupt.

6. The system according to claim 5 wherein said intermediate software layer releases the at least one peripheral after the processing operation.

7. The system according to claim 1 wherein the macro-instruction causes said intermediate software layer to send a software interrupt to call up the function.

8. A smart card comprising:
    an integrated circuit comprising a microprocessor and at least one peripheral;
    an application software layer comprising at least one process for calling up hardware processes to be executed on the at least one peripheral of the integrated circuit; and
    an intermediate software layer for creating a safety barrier between said application layer and the at least one peripheral by managing the hardware processes called up by the at least one process of said application software layer;
    said application software layer being mutually exclusive of said intermediate software layer and calling up a function of said intermediate software layer corresponding to a hardware process to be executed, with the function being called up by a macro-instruction of said intermediate software layer, and with a programming language of the macro-instruction being different from a programming language of said application software layer and said intermediate software layer.

9. The smart card according to claim 8 wherein said application software layer calls up the function by sending a software interrupt.

10. The smart card according to claim 9 wherein said intermediate software layer processes the software interrupt by verifying an availability of the called up function.

11. The smart card according to claim 8 wherein the macro-instruction causes said intermediate software layer to send a software interrupt to call up the function.

12. An integrated circuit comprising:
    a microprocessor and at least one peripheral;
    an application software layer running on the microprocessor comprising at least one process for calling up hardware processes to be executed on said at least one peripheral integrated circuit; and
    an intermediate software layer for creating a safety barrier between said application layer and the at least one peripheral by managing the hardware processes called up by the at least one process of said application software layer;
    said application software layer being mutually exclusive of said intermediate software layer and calling up a function of said intermediate software layer corresponding to a hardware process to be executed, with the function being called up by a macro-instruction of said intermediate software layer, and with a programming language of the macro-instruction being different from a programming language of said application software layer and said intermediate software layer.

13. The integrated circuit according to claim 12 wherein said application software layer calls up the function by sending a software interrupt.

14. The integrated circuit according to claim 13 wherein said intermediate software layer processes the software interrupt by verifying an availability of the called up function.

15. The integrated circuit according to claim 12 wherein the macro-instruction causes said intermediate software layer to send a software interrupt to call up the function.

16. A method for managing at least one peripheral of a microprocessor-based integrated circuit for a smart card comprising:

calling up hardware processes to be executed on the at least one peripheral of the integrated circuit using at least one process of an application software layer; and creating a safety barrier between said application layer and the at least one peripheral by managing the hardware processes called up by the at least one process of the application software layer using an intermediate software layer;

the application software layer being mutually exclusive of said intermediate software layer and calling up a function of the intermediate software layer corresponding to a hardware process to be executed, with the function being called up by a macro-instruction of the intermediate software layer, and with a programming language of the macro-instruction being different from a programming language of the application software layer and the intermediate software layer.

17. The method according to claim 16 wherein the application software layer calls up the function by sending a software interrupt.

18. The method according to claim 17 wherein the intermediate software layer processes the software interrupt by verifying an availability of the called up function.

19. The method according to claim 16 wherein the macro-instruction causes the intermediate software layer to send a software interrupt to call up the function.

* * * * *